Nov. 7, 1933.  G. H. PHELPS  1,934,374
ELECTRIC WELDING
Filed May 15, 1929
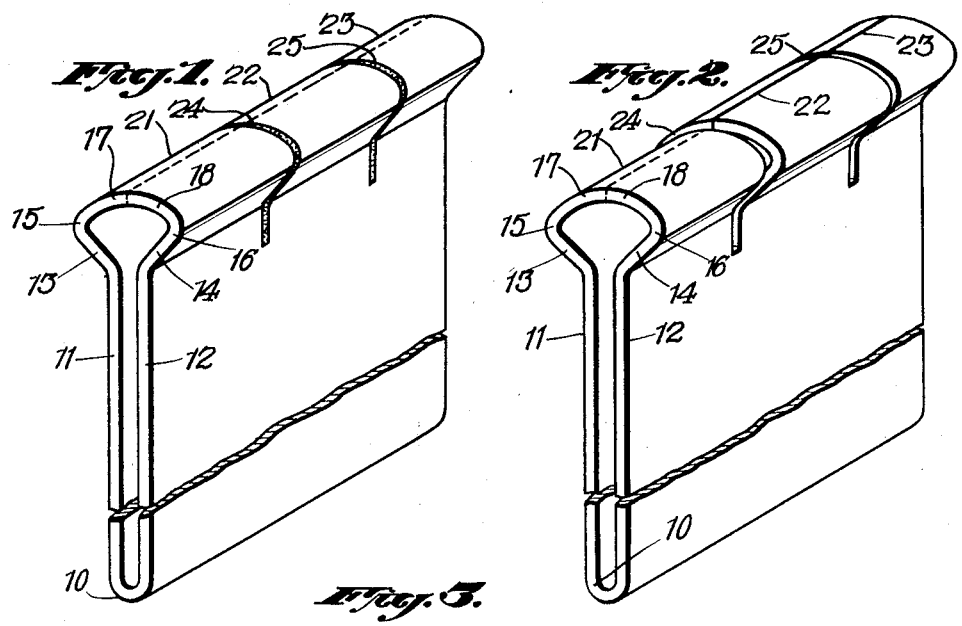
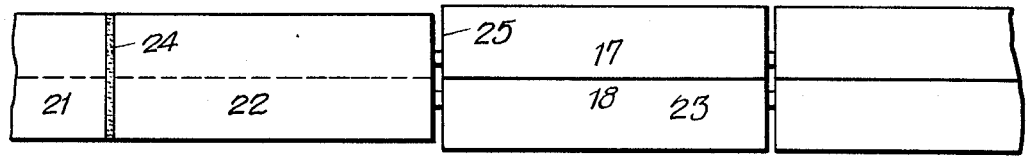
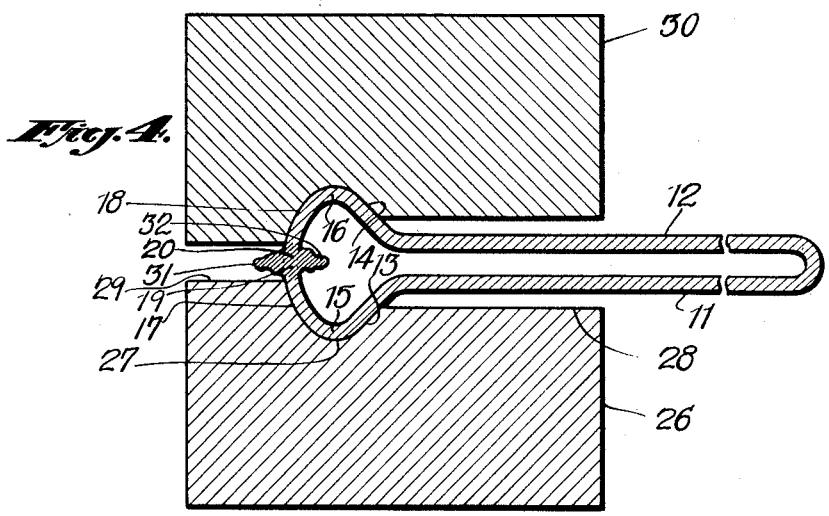
Inventor
George H. Phelps
By his Attorneys
Usina & Rauber Patented Nov. 7, 1933

1,934,374

UNITED STATES PATENT OFFICE 1,934,374

ELECTRIC WELDING

George H. Phelps, Warehouse Point, Conn., assignor to Metropolitan Engineering Company, Brooklyn, N. Y., a corporation of New York Application May 15, 1929. Serial No. 363,138

8 Claims. (Cl. 219—10)

This invention relates to methods and apparatus for electric welding and more particularly to electric butt welding methods and apparatus applicable to the welding of long seams joining the edges of flat sheets or forming a longitudinal closing seam for a hollow or tubular article.

To form a good butt weld between the edges of two metallic sheets it is desirable to have the portions of the two sheets that are to be joined project towards each other straight from the electrodes and at right angles to the electrode faces, and to maintain the sheet adjacent the edges in this position without sliding or twisting in the electrodes during welding.

In the methods and apparatus heretofore used for the welding of sheets and tubular or hollow articles or similar objects, considerable difficulty has been encountered in maintaining the opposed edge portions of the sheet rigidly in position during welding, particularly when the articles are of such size that they cannot be placed in their entirety between the electrodes, or when the edges to be welded cannot be gripped.

An object of my present invention is to provide a simple method and apparatus for holding sheet metal of a flaring, tubular or other shape in electrodes for welding in such a manner that there will be no slipping or displacement or distortion of the edges being welded upon the application of pressure thereto.

Other objects of the invention are to provide a method and apparatus for welding tubular or hollow objects or of sheet material generally on long seams in which limited lengths of longitudinal seam, separated by short kerfs or slots, are welded separately and in which excessive loss of current through paths other than that of the welding current is avoided.

With these and other objects in view, which will more fully appear from the following description, the invention comprises the methods and apparatus described in the folowing specification and claims.

The various features of the invention are illustrated in the accompanying drawing, in which—

Fig. 1 is a perspective view of a hollow article welded in accordance with my present invention, the location of the butt weld being shown in broken line.

Fig. 2 is a perspective view similar to that in Fig. 1 showing the article partly welded.

Fig. 3 is a view of a partly welded article looking towards the longitudinal weld, and Fig. 4 is a cross sectional view through a pair of electrodes and a portion of a sheet metal object being butt welded on a longitudinal seam.

The present invention may be applied to a wide variety of articles that are to be welded on a long or continuous seam. In the example illustrated in the accompanying drawing the invention is shown as applied to the formation of a tubular object. The welding of sheet material or tubular objects on very long seams by a butt welding process requires either a welding machine of enormous length and capacity or a means for welding the seam in sections and providing a take-up for each of the sectional welds forming the seam. The form of the invention illustrated in the accompanying drawing is shown as applied to the sectional method of welding.

In the embodiment of the invention shown in Fig. 1, a sheet of metal is bent on a median longitudinal line as at 10 to form a pair of relatively flat, spaced areas 11 and 12. Near the outer side edges of the areas 11 and 12 the metal is bent outwardly as at 13 and 14 for a short narrow zone and is then curved inwardly on a short radius of curvature throughout an arc or angle 15 and 16 somewhat greater than 90 degrees, thus forming a pair of opposed longitudinal troughs. The outer walls of these troughs are extended towards each other in slightly curved extensions 17 and 18, the edges or marginal portions 19 and 20 of which are straight, or sufficiently straight to avoid tipping over under heat and pressure. The edge portions of the sheet are then separated into longitudinal sections 21, 22 and 23 by means of transverse cuts or kerfs 24 and 25 which extend through the trough portion of the metal and preferably a short distance into the spaced areas 11 and 12. The sheet metal thus formed is then ready to be welded.

In welding the adjacent horizontal edge portions 19 and 20, the sheet of metal is placed on a lower electrode 26 having a groove 27 formed to receive the groove 15 of the lower sheet area 11. The face 28 of the electrode on that side of the groove near the area 11 extends only a short distance above the lower or curved part of the groove so that it does not contact with the area 11. The electrode face 29 on the opposite edge of the groove, however, extends upwardly to the straight portion 19. The adjacent face of the groove is curved to fit the curvature of the zone 17 of the sheet metal so that when pressure is applied to the edge, the metal will be pressed into tight engagement with the face of the electrode while slipping or displacement is prevented by the sharpness of curvature of the sheet metal groove at 15 and of the electrode groove 27. The groove surfaces 14, 16 and 18 are similarly received in the lower face of an upper electrode 30. Accordingly, when the sheet metal is placed between the electrodes, the electrodes are brought towards each other and current is applied to the edges to be welded which are rigidly held in a straight direct line with each other. The effect of combining heat and pressure is, therefore, to tightly compress and weld the adjacent edges, the metal displaced in the take-up forming flashes or burrs 31 and 32 which may be removed when the object is removed from the electrodes. To promote the formation of the burr on the outside rather than on the inside of the weld, the straight, edge areas or zones 19 and 20 may be very slightly curved outwardly.

In the example shown in the accompanying drawing a longitudinal seam is formed successively in the section 21, 22 and 23 and then the slots or kerfs 24 and 25 are closed by the application of metal in an arc or gas weld. When the welding operation has been completed, the hollow article thus formed may be expanded to a tubular shape or circular cross section by the method shown in the Murray Patent #1,534,133, or other appropriate methods, or may be given any desired shape. Sections 11 and 12 need not be flat and close together at any points outside the electrodes, i. e., it may be desirable to form that part of this metal which reaches beyond any interference with the electrodes into a portion of a large circle or into any other convenient shape. In the event that the method is used for longitudinally or otherwise joining a pair of flat sheets, the sheets may be expanded or folded flat upon the completion of the weld and then straightened by rolling or straightening means. Owing to the form of the sheets and of the electrodes it will be apparent that the shortest path between the electrodes is through the edges to be welded and that consequently the flow of current through the areas 11 and 12 and the bend 10 or around the cuts or kerfs 24 and 25 during the welding operation is relatively small. Owing to the change in curvature of the grooves 15 and 16, all slippage or sliding of metal in the groove of the electrode is avoided.

What I claim is:

1. A method of welding which comprises bending a flat sheet of metal upwardly at an angle to its surface on a line extending lengthwise of, and slightly spaced from, the edges to be welded, thence curving said sheet in a zone between said line and the edge of said sheet to bring said edge toward the plane of said sheet and with an angle of incidence to said plane of less than 90°, heating said edge to a welding temeprature and applying pressure on the outer surface of the area between said bend and said edge to force said edge against a surface to which it is to be welded.

2. A method of welding two sheets, end to end, which comprises bending each of said sheets upwardly at an angle to their respective surfaces on a line extending lengthwise of, and slightly spaced from, the edges to be welded, thence curving said sheet in a zone between said line and the edge of said sheet to bring said edge to be welded toward the plane of said sheet and with an angle of incidence to said plane of less than 90°, placing said sheets in such position that the curved portion of each sheet is concave to the opposite sheet, heating said edges to be welded to a welding temperature and pressing said edges toward each other with pressure applied in the zone between said bend and said edge.

3. An article of the type described which comprises a sheet of metal for welding, having an area near one edge extending in a plane at an angle to the plane of said sheet, then extending in a zone of cylindrical curvature between said area and said edge, the curvature of said cylindrical portion being such as to bring said edge toward the plane of said sheet with an angle of incidence therefor of less than 90°.

4. A method of forming welded hollow articles which comprises bending a sheet of metal on a longitudinal median line to form a pair of closely spaced areas, forming a pair of opposed grooves, one on each area adjacent its longitudinal edge and in concave relation to the other, each of said grooves having a sharply curved trough, a slightly curved outer side and a straight narrow marginal portion supporting said trough and slightly curved portions, bringing said grooves toward each other thus supported to press said straight edges together, and passing current through said edges to cause them to weld together.

5. A method of forming hollow objects which comprises bending a sheet of metal longitudinally to form slightly spaced areas, forming opposed longitudinal grooves one on each of said areas adjacent the side edges of said areas, and concave to the other area, the outer walls of said grooves being slightly curved in the same direction of curvature as said grooves and having a straight narrow edge margin, separating said groove and edge portions into lengths at intervals by transverse cuts, separately butt welding the opposed edges of said grooves between said transverse cuts with pressure applied through said groove and curved edge portion, and welding said transverse cuts.

6. A method of forming hollow objects which comprises bending a sheet of metal longitudinally to form slightly spaced areas, forming opposed longitudinal grooves one on each of said areas adjacent the side edges of said areas, and concave to the other area, the outer walls of said grooves being slightly curved in the same direction of curvature as said grooves and having a straight narrow edge margin, opposed said groove and edge portions into lengths at intervals by transverse cuts, butt welding the edges of said grooves with pressure applied through said groove and curved edge portion, welding said transverse cuts and expanding to circular cross section.

7. A method of forming welded hollow articles which comprises bending a sheet of metal on a longitudinal median line to form a pair of closely spaced areas, folding said areas near their longitudinal edges to form a pair of opposed grooves, one on each area adjacent its longitudinal edge and in concave relation to the other, heating said sheets at their longitudinal edges to a welding temperature, and pressing them together into a butt weld by pressure applied in opposite directions on the outer surfaces of said opposed grooves.

8. A method of forming welded hollow articles which comprises bending a sheet of metal on a longitudinal median line to form a pair of closely spaced areas, forming a pair of opposed grooves, one on each area adjacent its longitudinal edge and in concave relation to the other, each of said grooves having a sharply curved trough, a slightly curved area adjacent said trough and between said trough and said edge and a straight narrow marginal portion, heating said sheet on its longitudinal edges to a welding temperature, and pressing said edges into a butt welded joint by pressure applied from opposite directions to the outer curved surfaces of said opposed grooves.

GEORGE H. PHELPS.

CERTIFICATE OF CORRECTION.

Patent No. 1,934,374.                                                            November 7, 1933.

GEORGE H. PHELPS.

It is hereby certified that error appears in the printed specification of the above numbered patent requiring correction as follows: Page 2, line 116, claim 6, for "opposed" read separating; and that the said Letters Patent should be read with this correction therein that the same may conform to the record of the case in the Patent Office.

Signed and sealed this 12th day of December, A. D. 1933.

F. M. Hopkins (Seal)                                              Acting Commissioner of Patents.